Feb. 27, 1940.  L. E. LA BRIE  2,192,012
MASTER CYLINDER FOR HYDRAULIC BRAKES
Filed Feb. 4, 1935  4 Sheets-Sheet 1

INVENTOR.
LUDGER E. LABRIE
BY Jerome R. Cox
ATTORNEY.

Feb. 27, 1940.                L. E. LA BRIE                2,192,012
                   MASTER CYLINDER FOR HYDRAULIC BRAKES
                          Filed Feb. 4, 1935           4 Sheets-Sheet 2
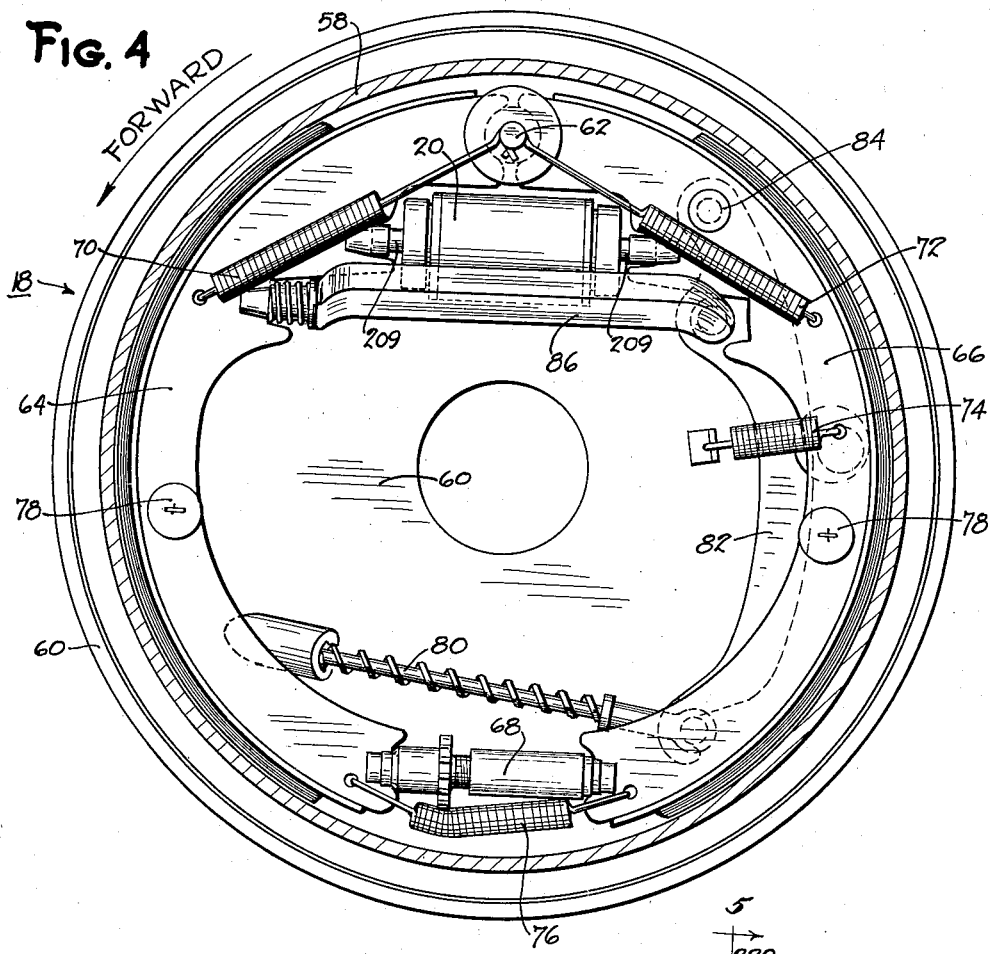
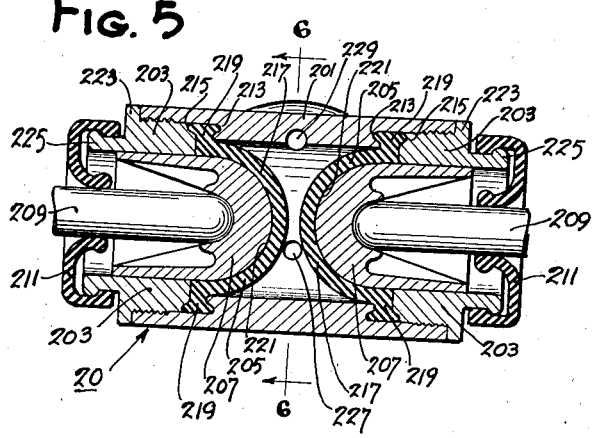
INVENTOR.
LUDGER E. LABRIE
BY Jerome R. Cox
            ATTORNEY.

Feb. 27, 1940.  L. E. LA BRIE  2,192,012
MASTER CYLINDER FOR HYDRAULIC BRAKES
Filed Feb. 4, 1935  4 Sheets-Sheet 3

INVENTOR.
LUDGER E LABRIE
BY Jerome R. Cox
ATTORNEY.

Feb. 27, 1940.  L. E. LA BRIE  2,192,012
MASTER CYLINDER FOR HYDRAULIC BRAKES
Filed Feb. 4, 1935  4 Sheets-Sheet 4
FIG. 8
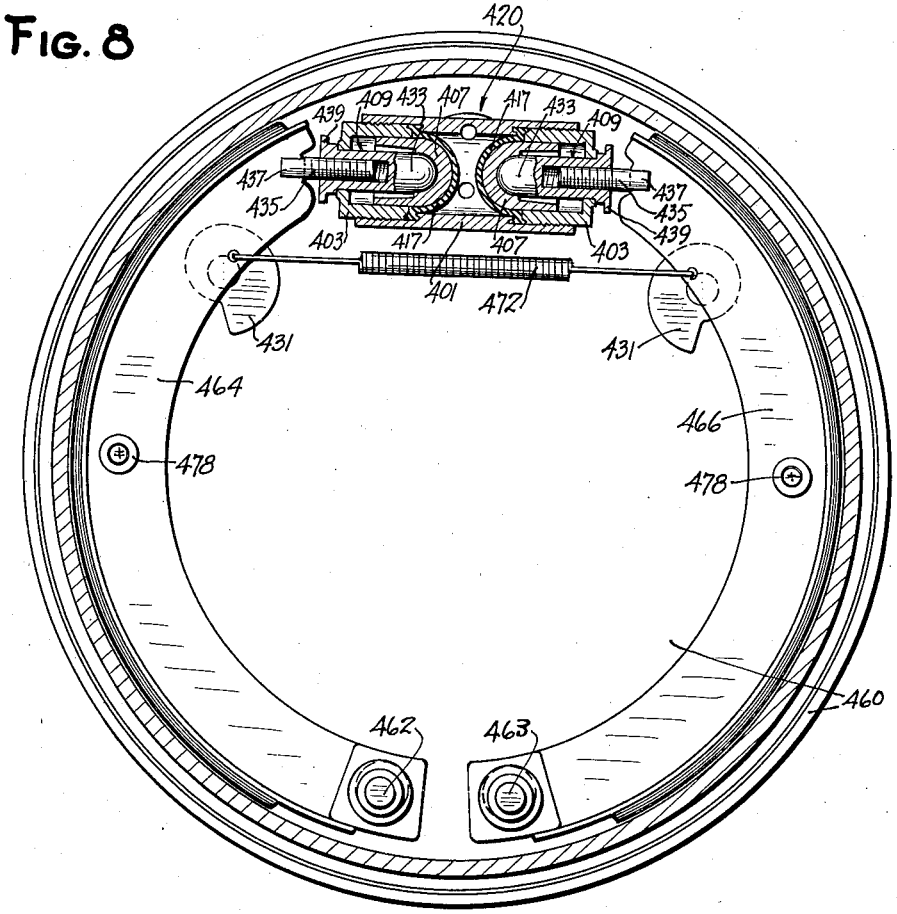
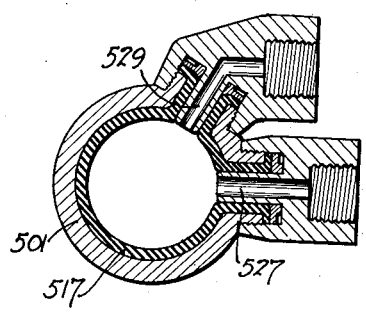
FIG. 10
INVENTOR.
LUDGER E. LA BRIE
BY Jerome R. Cox
ATTORNEY.

Patented Feb. 27, 1940

2,192,012

UNITED STATES PATENT OFFICE 2,192,012

MASTER CYLINDER FOR HYDRAULIC BRAKES

Ludger E. La Brie, South Bend, Ind., assignor to Bendix Products Corporation, South Bend, Ind., a corporation of Indiana Application February 4, 1935, Serial No. 4,802

3 Claims. (Cl. 60—54.6)

The invention relates to brakes and more particularly to hydraulic brake systems.

Usually heretofore commercial hydraulic brake systems have employed an actuating cylinder called a master cylinder, one or more actuated cylinders called motors or wheel cylinders and a conduit for connecting these cylinders, each of the cylinders having one or more movable pistons and having packing cups associated with each of the pistons.

There have been proposals to use flexible extensible diaphragms in place of the pistons and packing cups. However, these proposals have never heretofore gone into commercial use probably because of the losses of energy due probably to the effort necessary to stretch the diaphragms.

The conventional system using pistons and cups is open to the disadvantage that liquid losses may occur past the cups especially at the wheel cylinders. Moreover, it is absolutely necessary that some means be provided to prevent drawing air in at the wheel cylinders. If any air or other gas should become mixed with the liquid used, thereafter upon application of the brakes, the gas would be compressed, thus causing an objectionable springy pedal. In a system employing pistons both in the master cylinder and wheel cylinders when the pedal is released after application of the brakes, the master cylinder piston might return to its released position faster than the wheel cylinder pistons return. Should this occur there would be a vacuum created which would tend to draw in air past the wheel cylinder cups. It is to be noted that the cups are usually turned inward to prevent liquid leaks and therefore do not serve as efficiently to prevent the entrance of air. As stated above, it is usually necessary, therefore, to provide some added means to prevent the suction of air. In one form of commercial structure a spring loaded valve is provided to maintain the liquid ahead of the master cylinder under an increased pressure.

Where wheel cylinder diaphragms have been proposed they have usually been so arranged that application of the brakes would require stretching of the diaphragms so that there would be a swiftly increasing resistance to the application of the brakes. The limit of the stretching of the diaphragms too would be quickly reached. Therefore only a very short movement of the brake shoes would be possible and frequent adjustment would be necessary.

Due to the fact that the master cylinder usually supplies four wheel cylinders and that furthermore there are usually two movable members at each of the wheel cylinders, the travel of the master cylinder operating member is usually much greater than the travel of any one of the operating members at the wheel cylinders. The disadvantages of the use of diaphragms at the wheel cylinders are multiplied many times when it is attempted to use them at the master cylinder.

I have discovered that the use of the combination of a piston type master cylinder and a diaphragm type wheel cylinder eliminates many of the disadvantages of each type of system where used throughout. Moreover I have designed a wheel cylinder having all of the advantages of the previously proposed diaphragm wheel cylinders but in which most of the disadvantages are eliminated. Furthermore I have designed a master cylinder of the piston type so designed that when the brakes are released all parts of the pressure system are not maintained at a pressure substantially above atmospheric, with a consequent elimination of the costs of extra valves, with an elimination of the necessity of having extra strength brake return springs, on account of superatmospheric pressure and with a consequent lowering of the pedal pressures necessary for the initial and also subsequent application of the brakes.

One of the objects of my invention is therefore the improvement of hydraulic brake systems.

A further object is the efficient sealing of such a system to prevent the drawing of air into the system.

A further object is the elimination of extra valves provided solely for the prevention of the drawing in of air and the consequent reduction of cost.

A further object is the improvement of diaphragm type wheel cylinders so as to increase the available travel of the movable elements and to decrease the resistance to movement thereof.

A further object of the invention is to provide a master cylinder in which the flow of compensating fluid past the master cylinder piston is accomplished more easily.

A further object is the provision of means for adjusting the length of the connections between the movable elements of a diaphragm type wheel cylinder and the shoes actuated thereby.

Features of the devices shown to illustrate my invention include the combination of a master cylinder of the piston type with a wheel cylinder of the diaphragm type; a master cylinder piston formed with a hollow chamber always connected with a reservoir supplying liquid thereto and also provided with an annular cup through which liquid may flow easily; a diaphragm type wheel cylinder in which the diaphragm is, during the first part of the brake applying stroke, relieved of tension; a diaphragm type wheel cylinder in which the pistons external of the diaphragms are formed with convex surfaces in contact with the diaphragms; and as a modification a diaphragm type wheel cylinder in which the diaphragms are flexible but substantially inextensible.

Further objects and features of the invention will be apparent from consideration of the subjoined specification and claims in connection with the accompanying drawings, in which:

Figure 4 is an enlarged view in section showing one of the wheel brakes of Figure 1;

Figure 5 is a sectional view taken substantially on the line 5—5 of Figure 6 showing in section the wheel cylinder of Figure 4;

Figure 6 is a sectional view taken substantially on the line 6—6 of Figure 5;

Figure 8 is a view similar to Figure 4 but showing a modified form of wheel cylinder and a different type of brake and showing the wheel cylinder and connected parts in section;

Figure 10 is a sectional view taken substantially on the line 10—10 of Figure 9.

Figure 1:
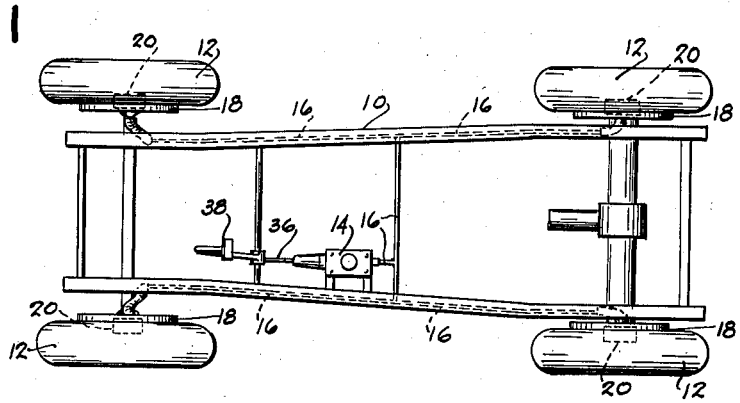
Figure 1 is more or less a diagrammatic plan view of the chassis of an automobile showing the main features of the braking system therefor.

Referring to Figure 1 of the drawings I have shown for illustration of my invention a braking system for an automobile having a frame 10 and wheels 12. The braking system shown for illustration comprises a master cylinder 14, conduits 16, brakes 18, and wheel cylinders 20.

The master cylinder 14 used to illustrate my invention comprises (see Figure 2) a casting formed with a main bore 22, with a reservoir 24 and with an opening 26 connected to one of the conduits 16 leading to the brakes. Within the bore 27 there is provided a piston 28, the piston being formed with a central recess 30 with a forwardly extending passage 32 extending from the recess 30 to a point adjacent the forward end of the piston, and with a plurality of small external annular grooves such as 34a, 34b, and 34c providing fluid seals for the piston and connected by bores 35a, 35b, and 35c respectively with the central recess 30. Connected to the rear end of the piston by a universal joint is a piston rod 36 by means of which the pedal 38 (Figure 1) acts to move the piston 28 forwardly to apply the brakes.

The piston is provided with a forward projection 40 formed with inclined bores 42 and with a groove 44. Around the projection 40 there is secured an annular cup 46 formed with a tongue 47 which fits in the groove 44 whereby the cup is held in position on the front end of the piston. The inclined bores 42 lead to the central lip of the cup 46 and liquid may at times pass forward through the passage 32 outward through the bores 42 and deflecting the central lip of the cup pass to the portion of the cylinder ahead of the piston.

Figure 2:
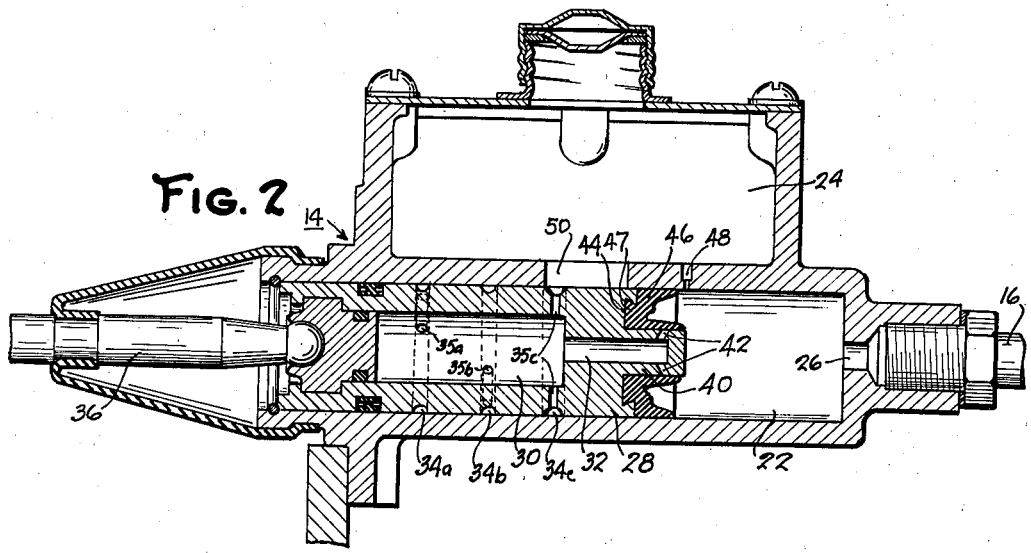
Figure 2 is an enlarged view in section of the master cylinder of the braking system shown in Figure 1.

The position of the piston shown in Figure 2 is the normal released position of the piston and the first forward movement thereof to apply the brakes causes the outer lip of the cup 46 to pass over a port 48 which is formed in a wall of the main bore and which normally allows liquid to pass between the reservoir and the main bore. However, when the outer lip of the cup passes over this port 48 liquid may not escape from the portion of the bore 22 ahead of the piston 28 and passage of fluid from the reservoir to the forward portion of the bore is substantially prevented.

Means are provided to supply additional liquid from the reservoir to the forward portion of the bore on the return stroke of the piston whenever additional fluid is needed. The groove 34c and the ports 35c are connected at all times with a relatively long opening 50 spaced rearwardly from the port 48 and thus the recess 30 is at all times connected with the reservoir 24 and as stated above liquid may flow from the recess 30 through the passage 32, the inclined bores 42 and past the inner lip of the cup 46. Thus should the pressure ahead of the piston 28 drop to less than atmospheric (as on the return stroke of the piston) liquid flows through the passages described to the front of the piston, the inner lip of the cup 46 forming a check valve allowing the passage of liquid forwardly but not rearwardly.

Additional seals such as 52 and 54 may be provided if desired.

Figure 3:
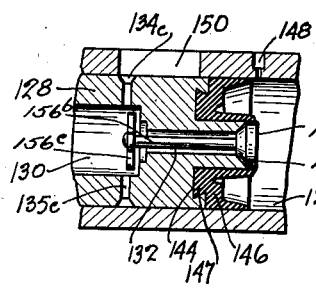
Figure 3 is a fragmentary sectional view showing a modified detail of a master cylinder generally similar to the one shown in Figure 2.

In Figure 3 I show a modified form of check valve. Therein the passage 132 extends through the front of the piston 128 and within the passage there is positioned a valve member 156 comprising a conical member 156a filling the front end of the recess, a grooved stem member 156b extending through the recess and a scalloped disk 156c secured to the inner end of the stem.

The wheel brakes 18 shown for illustration of my invention each comprise a rotating drum 58, a stationary backing plate 60, an anchor pin 62 secured on the backing plate, and a pair of shoes 64 and 66 connected by an adjustable strut 68 arranged to anchor on the anchor pin 62. The shoes are normally held in released position by springs 70, 72, 74 and 76 their position being then determined by the anchor pin 62, the cylinder 20 and the springs. The lateral position of the shoes is controlled by the steady rests 78. The brake may be applied either by the wheel cylinder 20 or by mechanical applying means the mechanical applying means comprises a Bowden cable 80, an applying lever 82 pivoted on the shoe 66 at 84 and a strut 86 pivotally connected at one end to the lever 82 and contacting at the other end with the shoe 64.

The wheel cylinder 20 is shown most clearly in Figures 5 and 6 and comprises a central generally cylindrical casing member 201; a pair of cylindrical end members 203 screwed into the ends of the casing member 201; a pair of diaphragms 205, each clamped between one end member 203 and the casing member 201; a pair of pistons 207, one associated with each diaphragm; a pair of piston rods 209, one for each piston; and a pair of dust covers 211. The casing 201 is formed adjacent to each end with a pair of annular grooves 213 into which a part of a generally T-shaped section of the diaphragm extends and is clamped. The end members 203 have their inner portions formed of a generally angular section so that when assembled there is a cooperating annular groove 215 opposite the annular groove 213 in the casing.

The diaphragms 205 are formed so that normally the web portion 217 is dome-shaped and the rims 219 are T-shaped in section as shown. The dome-shaped web portions 217 are arranged so that the convex faces thereof extend inward of the cylinder. The pistons are formed with spherical inner faces 221 which fit snugly into the outer concave faces of the diaphragms.

The end sections 203 are each formed as stated with an angular face which cooperates with an inner face of the casing 201 to form the groove 215. Each is also formed with a flange as 223 which serves as a limit beyond which the end member may not be screwed into the casing and thus insures that the diaphragm may be clamped tightly but not too tightly. Each end member is also provided with a flange such as 225 for holding the dust cap or boot 211.

The casing 201 is provided with a filling opening 227 connected with the conduit leading to the master cylinder. It is also formed with a bleed opening 229.

It is believed that the operation of the braking system shown will be clear from the above description. Pressure applied to the pedal 36 forces the piston 28 forward and applies pressure to the fluid in the cylinder 22, the conduits 16, and the wheel cylinders 20. This pressure distorts and compresses the diaphragms 217 and thus forces the piston 207 outward. Through the rods 209 this pressure is applied to the shoes 64 and 66 thus forcing the shoes into contact with the rotating drum 58. The drum causes one or the other shoe to anchor on the pin 62 and the rotating wheel is thus retarded.

Inasmuch as the diaphragms 217 do not have to stretch, (as illustrated and preferably they are slightly stretched in the released position) there is no lost energy expended in stretching the diaphragm. That is to say that due to applicant's arrangement of having his diaphragms initially stretched by the springs, he eliminates the necessity for a large part of the energy which would otherwise be necessary in expanding the diaphragms. In distorting diaphragms of this type the initial distortion can be accomplished with a relatively slight expenditure of energy. The energy necessary for subsequent distortion, however, builds up rapidly so that after the initial distortion a great deal of energy is required. By applicant's arrangement he is enabled to double the length of the relatively easy initial distortion and thus save the excessive energy which would be required for subsequent distortion. Inasmuch as the master cylinder has no diaphragm it is possible to have the relatively large movement of the piston thereof without difficulty. Inasmuch as the wheel cylinder diaphragms absolutely prevent the entrance of air past them, it is unnecessary to provide a valve maintaining the liquid at a relatively high pressure and the return springs may be kept to minimum strength.

When the pedal is allowed to return to release the brakes, fluid may flow from the reservoir through the bore 35c (or 135c) the recess 30 (or 130) the passage 32 (or 132) and deflecting the inner lip of the cup 46 (or 146) maintain a sufficient volume of fluid ahead of the master cylinder piston. Increases or decreases in the volume of liquid due to temperature changes and excesses of liquid accumulated by entrance through the passage 32 (or 132) on the return stroke, may readily be adjusted after the piston is fully returned through the port 48 (or 148).

Figure 7:
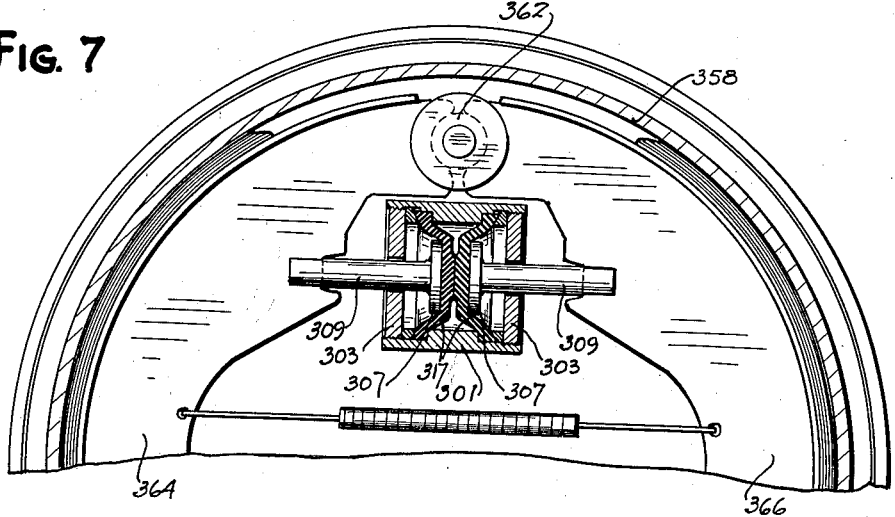
Figure 7 is a fragmentary sectional view corresponding to a portion of Figure 4 but having parts in section showing a modified form of wheel cylinder.

In Figure 7 I show a modified arangement of the wheel brake structure. Therein shoes 364 and 366 are adapted to be moved into contact with the drum 358 and thereafter to anchor on the anchor pin 362. The shoes are moved into contact with the drum by a motor comprising a casing 301 having end disks 303, flexible diaphragms 317, pistons 307, and piston rods 309. The flexible diaphragms in this case are flexible but not extensible.

The modified embodiment of Figure 7 operates exactly like the embodiment shown in Figures 4, 5 and 6 except that the diaphragms being flexible but not extensible merely fold upon themselves in moving from the released position shown in Figure 7 to their applied position in which the shoes are moved into contact with the drum by outward movement of the pistons 307 and of the flexible diaphragms 317.

In Figure 8 I show another modified wheel brake. Therein the shoes 464 and 466 are each separately anchored, shoe 464 on anchor pin 462 and shoe 466 on anchor pin 463. The pins are secured in backing plate 460 and the shoes are positioned in their released positions by adjustable eccentrics 431. A single return spring 472 serves to return them to their released position. Steady rests 478 position the shoes laterally. The shoes are applied by a cylinder 420 generally similar to the cylinder 20 shown in detail in Figures 5 and 6.

As shown in Figure 8 the cylinder comprises a central casing 401, end members 403, diaphragms 417, pistons 407 and piston rods 409. The piston rods 409 are formed in two sections, however. The inner sections 433 are bored and internally threaded to receive the externally threaded sections 435. The outer sections 435 are slotted as at 437 to fit over the ends of the shoes so that the sections 435 will not rotate. Notched shouldered wheels 439 are formed on the sections 433 whereby the sections 433 may be rotated to increase the effective length of the piston rods.

The operation of these modifications is similar to the operation described above. When the fluid within the cylinder 420 (or 520) is subjected to pressure, the diaphragms 417 (or diaphragm 517) are compressed or distorted and thus the pistons 407 (or 507) and the piston rods 409 (or 509) are forced outwardly to move the shoes into contact with the rotating drum. The braking torque is taken by the anchor pins 462 and 463 (or similar anchor pins not shown in Figure 9).

Figure 9:
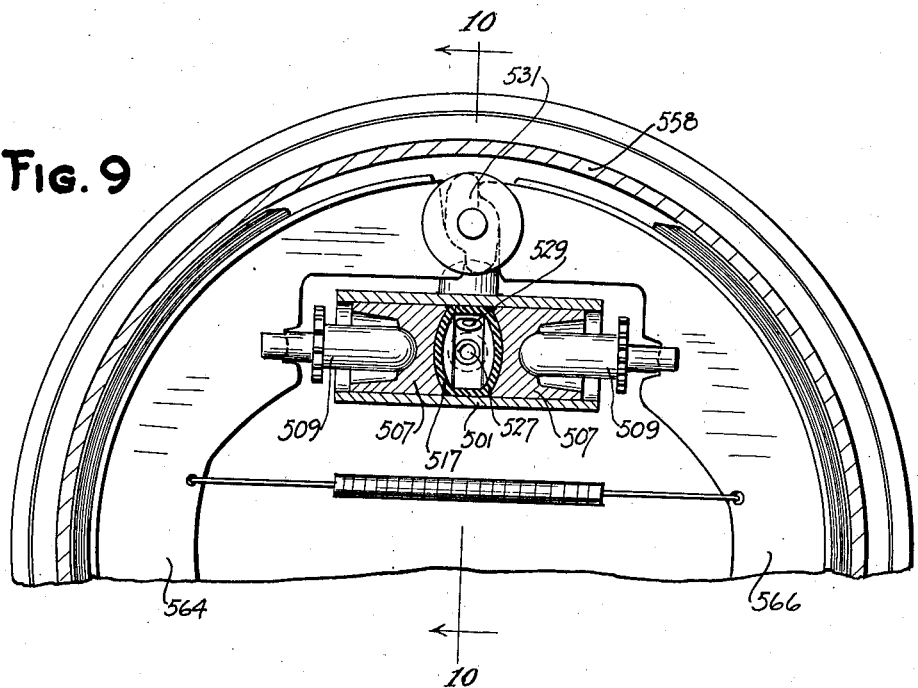
Figure 9 is a view similar to Figure 7 showing a further modified form of wheel cylinder used with a brake of the type shown in Figure 8.

In Figures 9 and 10 I show another modified arrangement of the wheel brake similar to the arrangement of Figure 8. Therein the shoes 564 and 566 are adapted to be moved into contact with drum 558 by a motor comprising a casing 501 having a single bag-like diaphragm 517 formed with an inlet opening 527 and a bleed opening 529. The motor also includes pistons 507 having piston rods 509 constructed like the piston rods 409 of Figure 8. The released position may be determined by a pin 531.

Thus I have provided a hydraulic brake system in which there is no danger of drawing in air at the wheel cylinders and yet the master cylinder piston is capable of moving an adequate distance to operate efficiently. Moreover, I have provided diaphragm type wheel cylinders in which a relatively long movement is possible.

This type of wheel cylinder is, I believe, the only type known capable of being used with a shiftable anchorage brake such as that shown in Figures 4–8 inclusive, inasmuch as this type of brake requires an exceedingly long piston travel.

It is to be understood that the above described embodiments of my invention are for the purpose of illustration only and various changes may be made therein without departing from the spirit and scope of the invention.

I claim:

1. A hydraulic brake system comprising a master cylinder, a reservoir formed integral with said master cylinder, a wheel cylinder, means for connecting said cylinders, said master cylinder being formed with a bore provided at one end with an opening leading to said connecting means and having a piston positioned in said bore which piston is formed with a central concentric recess connected at all times with said reservoir, is formed with a passage leading from said recess to the front of the piston, is formed with a forwardly extending concentric projection, and is provided with an annular sealing cup having an outer flange contacting with the outer wall of said cylinder and having an inner flange contacting with the sides of said projection, the outer flange serving to seal said cylinder to prevent fluid from passing rearwardly around the sides of the piston and the inner flange serving normally to prevent fluid from passing rearwardly from the forward portion of said cylinder through said passage to said recess.

2. A hydraulic brake system comprising a master cylinder, a reservoir formed integral with said master cylinder, a wheel cylinder, means for connecting said cylinders, said master cylinder being formed with a bore provided at one end with an opening leading to said connecting means and having a piston positioned in said bore which piston is formed with a central concentric recess connected at all times with said reservoir, is formed with a passage leading from said recess to the front of the piston, is formed with a forwardly extending concentric projection, and is provided with an annular sealing cup having an outer flange contacting with the outer wall of said cylinder and having an inner flange contacting with the sides of said projection, the outer flange serving to seal said cylinder to prevent fluid passing rearwardly thereby around the sides of the piston and the inner flange serving to prevent fluid from passing rearwardly from the forward portion of said cylinder through said passage to said recess while allowing fluid to pass at all times substantially freely from said reservoir through said recess and forward through said passage to the forward part of the master cylinder.

3. A hydraulic brake system comprising a master cylinder, a reservoir formed integral with said master cylinder, a wheel cylinder, means for connecting said cylinders, said master cylinder being formed with a bore provided at one end with an opening leading to said connecting means and having a piston positioned in said bore which piston is formed with a central concentric recess connected at all times with said reservoir, is formed with a passage leading from said recess to the front of the piston, is formed with a forwardly extending concentric projection, and is provided with an annular sealing cup having an outer flange contacting with the outer wall of said cylinder and having an inner flange contacting with the sides of said projection, the outer flange serving to seal said cylinder to prevent fluid passing rearwardly thereby around the sides of the piston and the inner flange serving to prevent fluid from passing rearwardly from the forward portion of said cylinder through said passage to said recess while allowing fluid to pass at all times substantially freely from said reservoir through said recess and forward through said passage to the forward part of the master cylinder, said projection being formed with laterally extending ports normally covered by said inner flange on the outside of the projection and connecting on the inside of the projection with said passageway.

LUDGER E. LA BRIE.